United States Patent

[11] 3,571,556

[72] Inventor Friedrich Wustner
 Wolfratshausen, Germany
[21] Appl. No. 809,063
[22] Filed Mar. 21, 1969
[45] Patented Mar. 23, 1971
[73] Assignee Siemens Aktiengesellschaft
 Berlin, Germany
[32] Priority Apr. 8, 1968
[33] Switzerland
[31] 5,208/68

[54] PLASMA WELDING TORCH
 6 Claims, 5 Drawing Figs.
[52] U.S. Cl. .................................................. 219/121,
 219/75
[51] Int. Cl. ............................................... B23k 9/00
[50] Field of Search ........................................ 219/74, 75,
 76, 77, 121, 130, 136, 137

[56] References Cited
 UNITED STATES PATENTS
 2,868,950 1/1959 Gage ............................ 219/74
 3,130,292 4/1964 Gage et al. .................... 219/121X
 3,132,240 5/1964 McCartney ................... 219/75X Primary Examiner—J. V. Truhe
Assistant Examiner—C. L. Albritton
Attorney—Hill, Sherman, Meroni, Gross & Simpson ABSTRACT: A plasma welding torch or burner generally including a cylindrical body portion, an electrode carried by the body, a plasma gas nozzle, a protective gas nozzle concentrically disposed around the plasma gas nozzle and engaging the body in a manner to clamp the plasma nozzle in position on an end portion of the body. The body has a pair of elongated apertures formed therethrough and aligned with a longitudinal axis thereof. A pair of conduits are secured to the plasma nozzle and form inlet and outlet passageways for directing coolant through a coolant chamber in the plasma gas nozzle. The pair of conduits are carried within the elongated apertures formed in the body, and a pair of connectors overlie an end portion of the conduits to provide connection means to a source of coolant and to seal the conduits in position. The body portion is further characterized by another elongated aperture formed parallel of the longitudinal axis and opening into an annular chamber formed between the protective gas nozzle and an outer surface of the body to provide passageway means for directing protective gas through the protective gas nozzle. Plasma gas passes through a passageway formed in a sleeve disposed coaxially of the body and enters the plasma nozzle through lateral slots formed in a collet received in the sleeve and securing the electrode onto the body.

INVENTOR
FRIEDRICH WÜSTNER

PLASMA WELDING TORCH

BACKGROUND OF THE INVENTION

1. Field of the Invention

The present invention generally relates to a torch or a burner for plasma welding, and particularly refers to a plasma welding torch for joining thin gauge blanks.

2. Description of the Prior Art

Progressive miniaturization of electrical components has raised many new problems in the welding field, since miniaturized electrical components must be produced at a minimum production cost and in a manner producing components having high operating reliability.

The operating safety or reliability primarily depends on both the mechanical and electrical quality of connections formed between identical or different materials. Prior art welding equipment has not adequately provided the flawless welding and soldering required to mass produce highly reliable, miniaturized electrical components.

Also, mass production of miniaturized electrical components without an excessive number of defects requires welding methods having a high degree of reproducibility, and in many cases, it is necessary to combine materials without using separate welding or soldering materials.

It has been found that plasma welding methods successively produce connections in miniature components, and those methods permit forming welding points of unlimited length and produce vacuum tight connections between highly heat resistant materials.

Heretofore, plasma welding of miniaturized electrical components has been performed on a limited scale, and the prior art does not provide a plasma welding torch capable of being utilized on a mass production line or in an automatic welding machine. Equipment for mass production must be easily repaired to reduce downtimes of the machine or production line and highly reliable to keep repairs to a minimum. Also, an ignition electrode of plasma welding torches require continuous maintenance, such as readjustment, grinding, etc., and thus, the electrode must be easily accessible.

To initiate the welding process in microplasma welding, a high-voltage and high frequency current produced by a generator is applied to the mass of the burner and to the electrode disposed therewithin and insulated from the burner housing by a small air gap, thereby producing an auxiliary electric arc in the area of the air gap through which the plasma gas passes. That auxiliary electrical arc ionizes the plasma gas as the same passes through the air gap. Also, a welding voltage produced by a welding current generator is connectable to the burner and is applied to the workpiece to be welded. When the welding current is connected, a plasma beam of high temperature is produced and directed to the workpiece.

Most prior art devices permit access to the electrode by removably fastening a plasma gas nozzle, which surrounds the electrode to a body of the torch. Furthermore, coolant lines, provided for conducting a coolant through the plasma nozzle, must be disconnected whenever the plasma gas nozzle is removed. The configurations of most prior art plasma welding torches have the distinct disadvantage of permitting the coolant, such as water, to reach an area surrounding the electrode whenever the plasma nozzle is removed to provide access to the electrode, and thus, unless the torch is permitted to dry for a prolonged period of time, the high frequency current required for ignition of the torch is short circuited by the collected moisture. Furthermore, seals, used heretofore, have been disposed between the plasma gas nozzle and the torch body. Thus, since the plasma nozzle is exposed to considerable fluctuations in temperature, those prior art seals oftentimes develop leaks resulting in failure of the torch.

SUMMARY OF THE INVENTION

A plasma welding torch, constructed in accordance with the present invention, generally includes a cylindrical torch body, a plasma gas nozzle disposed at one end portion of the body, a protective gas nozzle concentrically arranged around the plasma nozzle and an electrode carried by and insulated from the body and projecting through the plasma gas nozzle.

The plasma gas nozzle has a coolant chamber formed therein and characterized by inlet and outlet passageways. A pair of conduits are fixedly connected to the plasma gas nozzle and arranged to provide ingress and egress means for a coolant, such as water. The pair of conduits are inserted into elongated apertures formed through the torch body and disposed parallel to a longitudinal axis of the torch body.

The elongated apertures receiving the conduits are enlarged at an end portion of the body opposite the plasma gas nozzle, and a pair of connectors having a throughbore sized to telescopically engage an upper end portion of the conduits are engaged into the enlarged portions of the elongated apertures. Seal means are provided at the end portion of the body opposite the plasma gas nozzle and form a seal between the connectors, the conduits and the elongated apertures, thereby to prevent coolant from reaching the electrode. Also, whenever the plasma gas nozzle, including the fixedly attached conduits is removed, coolant will not drain onto the electrode.

The torch body is further characterized by a third elongated aperture formed therethrough and arranged parallel to the longitudinal axis. That aperture has a lateral extension opening into an annular recess formed between the torch body and the protective gas nozzle, thereby forming passageway means for a protective gas. Plasma gas passes through a passageway formed coaxially of the longitudinal axis of the body and enters the plasma nozzle through lateral slots formed in a collet member carrying the electrode.

Placement of the various conduits and passageways for the coolant, protective gas, and plasma gas within the torch body provides a compact plasma welding torch having a relatively small outer diameter. Also, the torch of the present invention has a cylindrical outer surface which may be machined to exactly fit within a tool holder of an automatic welding machine.

BRIEF DESCRIPTION OF THE DRAWINGS

In the accompanying drawings, forming a part of this specification and in which like reference characters are employed to designate like parts throughout the same.

DETAILED DESCRIPTION OF THE PREFERRED EMBODIMENT

Figure 1:
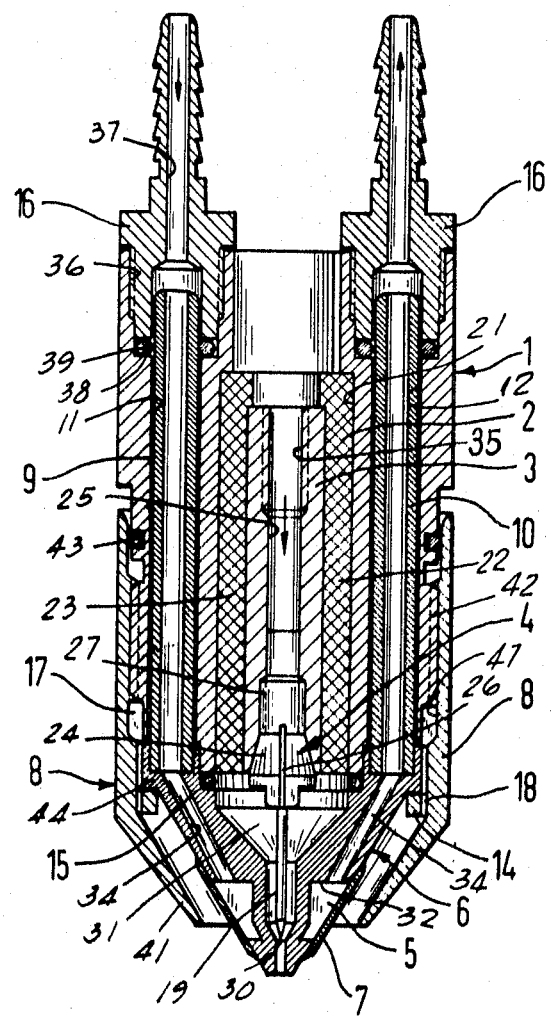
FIG. 1 is a longitudinal cross section of a plasma welding torch embodying the features of the present invention.
Figure 2:
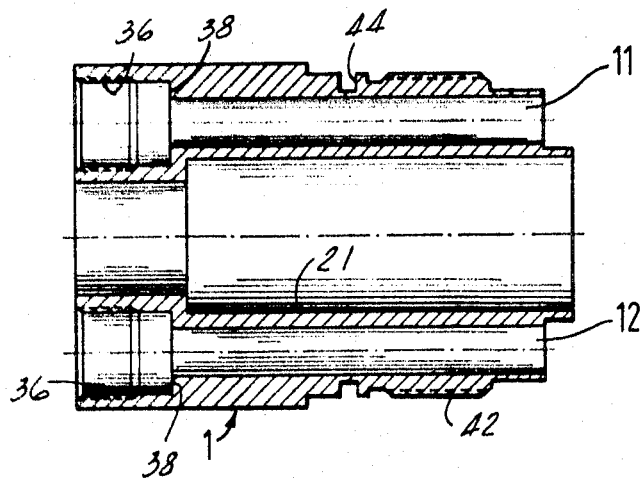
FIG. 2 is a longitudinal cross section of a body portion of the torch of the present invention.
Figure 3:
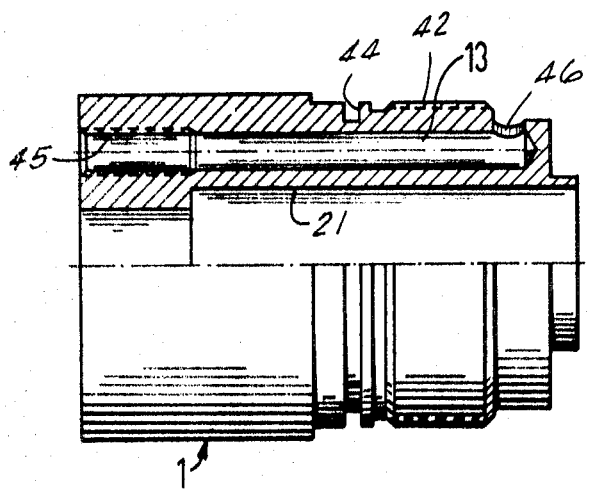
FIG. 3 is a partial, longitudinal cross section of the body portion taken along a different plane.

Referring to the drawings, a plasma welding torch, constructed in accordance with the principles of the present invention, generally includes a cylindrical body 1, a plasma gas nozzle 6 carried at one end of the body and surrounding an ignition electrode 19, and a protective gas nozzle 8 encircling the plasma gas nozzle. Also passageway means are provided for plasma gas, protective gas, and a coolant.

The body 1 is an elongated cylindrical member having a throughbore 21 for receiving a chuck means holding the electrode 19. The chuck means generally includes a collet 4 and a clamping sleeve 22 disposed within the bore 21 and insulated from the body 1 by a sleeve 23 composed of insulating material. The collet 4 has a throughbore sized at a lower end portion to receive the electrode 19 and is characterized by a tapered portion 24 having lateral slits as at 26 formed therein. A threaded portion 27 on the collet 4 engages complementary formed threads in an axially elongated bore 25 of the clamping sleeve 22, thereby drawing the tapered portion of the collet 4 into a conically formed portion of the bore 25 to securely clamp the electrode 19 within the collet 4.

Figure 4:
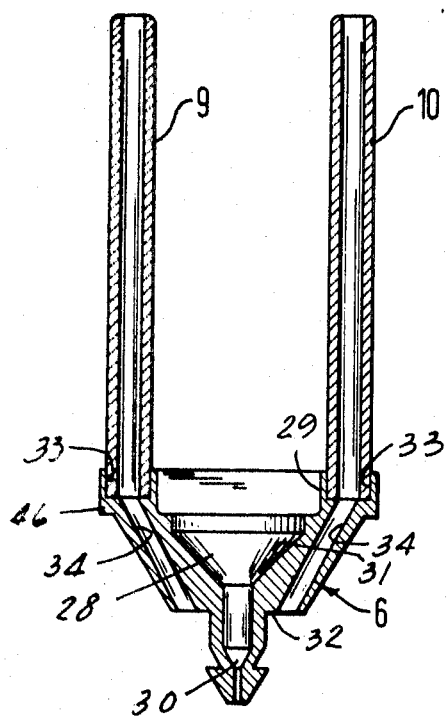
FIG. 4 is a longitudinal cross section of a plasma gas nozzle of the torch of the present invention.
Figure 5:
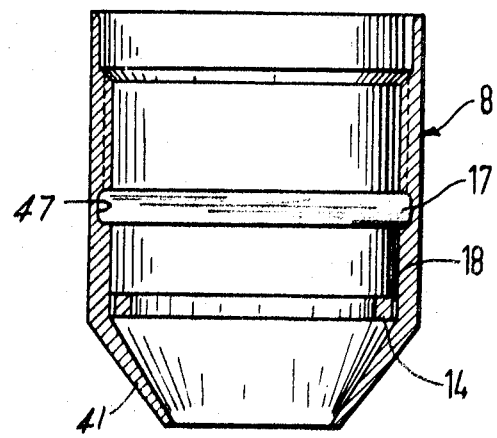
FIG. 5 is a longitudinal cross section of a protective gas nozzle of the torch of the present invention.

In accordance with the principles of the present invention, the plasma gas nozzle 6, as illustrated in FIGS. 1 and 4, generally includes a conically formed nozzle portion having a throughbore 28, and a pair of coolant conduits or tubes 9 and 10. The throughbore 28 has an enlarged upper end portion 29 sized to fit around a lower end portion of the body 1. Also, an orifice 30 and a plasma gas chamber 31 are formed by the bore 28 of the nozzle 6. Plasma gas passes through the bore 25 formed in the clamping sleeve 22 and enters the chamber 31 through the slits 26 formed in the collet member 4. An upper end portion of the bore 25 has a threaded portion 35 for receiving a connector of a plasma gas supply line, and for connecting a high voltage generating source to the electrode 19 for producing an auxiliary electrical arc between the electrode and the plasma gas nozzle 6 in the orifice 30.

An annular coolant chamber 5 is formed near a tip of the plasma gas nozzle by a substantially circumferential recess 32 and a frustoconical shroud member 7 fitted over the nozzle 6 and closing the recess. The body portion of the nozzle 6 has a pair of diametrically opposed recesses 33, 33 formed in an upper end portion and sealingly receiving lower end portions of the coolant tubes 9 and 10, thereby to form the plasma gas nozzle and coolant tubes as in integral unit. Also, passageways 34, 34 connect the coolant tubes 9 and 10 with the annular coolant chamber 5.

When assembled, the plasma gas nozzle 6 fits over a lower end portion of the body 1 with the coolant tubes 9 and 10 received in a pair of diametrically opposed apertures 11 and 12. Also, a seal 15 is disposed between the plasma gas nozzle 6 and the body 1 to seal the plasma gas chamber 31 at a juncture line between the nozzle 6 and the body.

To connect the coolant tubes 9 and 10 to a source of coolant, a pair of stuffing boxes 16, 16, having hose connections formed thereon, are threadly engaged into enlarged portions as at 36 of the apertures 11 and 12. The stuffing boxes 16, 16 are characterized by a throughbore 37 having an enlarged, lower end portion telescopically receiving upper end portions of the coolant tubes 9 and 10. Also, seals as at 37 rest on shoulders as at 38 formed by the enlarged portions 36 of the apertures 11 and 12 and tightly engage outer perimeters of the coolant tubes 9 and 10. As the stuffing boxes 16, 16 are threaded into the body 1, the seals 37 are compressed, thereby to form a tight seal between the body 1, and the coolant tubes 9 and 10 and also between the stuffing boxes 16, 16 and the coolant tubes. Thus the seals 37 prevent coolant from entering a region surrounding the electrode 19.

Also, when maintenance of the electrode 19 requires removal of the plasma gas nozzle 6, hoses supplying coolant are disconnected and the entire assembled nozzle is removed from an appropriate tool holding means. Thus, coolant may be drained from the chamber 5 and the coolant tubes 9 and 10, and the plasma gas nozzle 6, including the coolant tubes may be withdrawn from the body 1 without spilling coolant, such as water, onto wall surfaces forming the plasma gas chamber 31.

Also, in accordance with the principles of the present invention, the protective gas nozzle 8 includes a substantially tubular member characterized by a frustoconical end portion 41 encircling the plasma gas nozzle 6 and formed complementary to a taper of the plasma gas nozzle. The body 1 has externally formed threads as at 42 engaged by complementary formed threads of the protective gas nozzle, thereby holding the protective gas nozzle in assembled relationship to the body. A ring seal 43 fits within a circumferential groove 44 formed on the body 1 and engages an internally formed cylindrical surface of the protective gas nozzle to form a seal therebetween.

Retention means holding the plasma gas nozzle 6 firmly against a lower end portion of the body 1 include an annular shoulder 46 formed on the plasma gas nozzle 6 and an inwardly projecting, annular flange 14 formed on the protective gas nozzle 8. As the protective gas nozzle 8 is threaded onto the body 1, the flange 14 engages the shoulder 44 to firmly draw the plasma gas nozzle into position with the seal 15 compressed between the plasma gas nozzle and the body.

A protective gas is introduced into the plasma welding torch through a third aperture 13 formed in the body 1 parallel with a longitudinal axis thereof. The aperture 13 is characterized by a threaded portion 45 for receiving a connector of a protective gas supply line and a laterally extending, outlet opening 46. An annular chamber 17 is formed between the protective gas nozzle 8 and the body 1 by an undercut groove 47 disposed within the protective gas nozzle and receive gas discharged through the lateral opening 46. Passageways from the annular chambers 17 to an exit end or mouth of the protective gas nozzle 8 are provided by a series of circumferentially spaced apertures 18 formed through the inwardly projecting annular flange 14.

To permit the plasma welding torch of the present invention to be utilized in an automatic welding machine or on a mass production line, outer cylindrical surfaces of the body 1 and the protective gas nozzle 8 may be machined to form a continuous, smooth cylindrical surface sized to fit within an appropriate tool holder or chuck means.

From the foregoing description, it should be noted that the plasma welding torch of the present invention provides a unitary torch head having internally formed conduits and passageways for the plasma gas, the protective gas and the coolant, such as water. Also, the connections and passageways for the coolant are arranged to prevent coolant from entering the area surrounding the electrode when the torch is disassembled, thereby to provide a plasma welding torch which may be easily disassembled for maintenance of the ignition electrode and reassembled without requiring prolonged drying times.

Although minor modifications might be suggested by those versed in the art, it should be understood that I wish to embody within the scope of the patent warranted hereon all such modifications as reasonably and properly come within the scope of my contribution to the art.

I claim:

1. A plasma welding torch, comprising:
   a cylindrical body;
   an electrode carried by said body and electrically insulated therefrom;
   a plasma gas nozzle disposed at one end of said body encircling said electrode, and having a cooling chamber formed therein;
   a protective gas nozzle concentrically disposed around said plasma gas nozzle and retained on said body in a manner to clamp the plasma gas nozzle to said body;
   first passageway means in said body and directing plasma gas through said plasma gas nozzle;
   second passageway means in said body and directing protective gas through said protective gas nozzle;
   said body having a pair of apertures formed longitudinally therethrough;
   a pair of conduit means sealingly secured to said plasma gas nozzle, disposed within said pair of apertures and forming inlet and outlet passageways for said coolant chamber; and
   connection means carried by said body and opening into said conduits for connecting said coolant chamber to a source of coolant.

2. A plasma welding torch, comprising:
   a cylindrical body;
   an electrode carried by said body and electrically insulated therefrom;
   a plasma gas nozzle disposed at one end of said body, encircling said electrode, and having a cooling chamber formed therein;
   a protective gas nozzle concentrically disposed around said plasma gas nozzle and retained on said body in a manner to clamp the plasma gas nozzle to said body;
   first passageway means in said body and directing plasma gas through said plasma gas nozzle;
   second passageway means in said body and directing protective gas through said protective gas nozzle;

said body having a pair of apertures formed longitudinally therethrough;

a pair of conduit means sealingly secured to said plasma gas nozzle, disposed within said pair of apertures and forming inlet and outlet passageways for said coolant chamber;

connection means carried by said body and opening into said conduits for connecting said coolant chamber to a source of coolant;

a collet member clamping said electrode and having a throughbore formed therein and a lateral slit intersecting said throughbore;

said body having a central throughbore a clamping sleeve disposed within said central throughbore and receiving said collet in a manner to firmly clamp said electrode within said collet; and said clamping sleeve having an axially extending aperture communicating with said throughbore of said collet member and connected to a source of plasma gas, whereby plasma gas is passed outwardly through said lateral slit of said collet member.

3. A plasma welding torch, comprising:

a cylindrical body;

an electrode carried by said body and electrically insulated therefrom;

a plasma gas nozzle disposed at one end of said body, encircling said electrode, and having a cooling chamber formed therein;

a protective gas nozzle concentrically disposed around said plasma gas nozzle and retained on said body in a manner to clamp the plasma gas nozzle to said body;

first passageway means in said body and directing plasma gas through said plasma gas nozzle;

second passageway means in said body and directing protective gas through said protective gas nozzle, said second passageway means including;

said body having a third aperture formed therein and disposed substantially parallel of a longitudinal axis thereof and also having a lateral opening intersecting said third aperture;

an annular chamber formed between said protective gas nozzle and said body and communicating with both said lateral opening and an exit mouth of said protective gas nozzle for directing protective gas to said protective gas nozzle;

said body having a pair of apertures formed longitudinally therethrough;

a pair of conduit means sealingly secured to said plasma gas nozzle, disposed within said pair of apertures and forming inlet and outlet passageways for said coolant chamber; and connection means carried by said body and opening into said conduits for connecting said coolant chamber to a source of coolant.

4. A plasma welding torch, comprising:

a cylindrical body;

an electrode carried by said body and electrically insulated therefrom;

a plasma gas nozzle disposed at one end of said body, encircling said electrode, and having a cooling chamber formed therein;

a protective gas nozzle concentrically disposed around said plasma gas nozzle and retained on said body in a manner to clamp the plasma gas nozzle to said body;

first passageway means in said body and directing plasma gas through said plasma gas nozzle;

second passageway means in said body and directing protective gas through said protective gas nozzle;

said body having a pair of apertures formed longitudinally therethrough;

a pair of conduit means sealingly secured to said plasma gas nozzle, disposed within said pair of apertures and forming inlet and outlet passageways for said coolant chamber;

connection means carried by said body and opening into said conduits for connecting said coolant chamber to a source of coolant;

said plasma gas nozzle having an annular recess formed around a perimeter thereof and disposed near a tip thereof; and a shroud member fixedly secured to said plasma gas nozzle and overlying said annular recess to form said coolant chamber.

5. A plasma welding torch, comprising:

a cylindrical body;

an electrode carried by said body and electrically insulated therefrom;

a plasma gas nozzle disposed at one end of said body, encircling said electrode, and having a cooling chamber formed therein;

a protective gas nozzle concentrically disposed around said plasma gas nozzle and retained on said body in a manner to clamp the plasma gas nozzle to said body;

first passageway means in said body and directing plasma gas through said plasma gas nozzle;

second passageway means in said body and directing protective gas through said protective gas nozzle;

said body having a pair of apertures formed longitudinally therethrough;

a pair of conduit means sealingly secured to said plasma gas nozzle, disposed within said pair of apertures and forming inlet and outlet passageways for said coolant chamber;

connection means carried by said body and opening into said conduits for connecting said coolant chamber to a source of coolant;

said plasma gas nozzle having an annular shoulder formed around a perimeter thereof;

said protective gas nozzle having an inwardly projecting flange engaging said shoulder in a manner to clamp said plasma gas nozzle onto said body; and said inwardly projecting flange having circumferentially spaced apertures directing a protective gas through said protective gas nozzle.

6. A plasma welding torch, comprising:

a cylindrical body;

an electrode carried by said body and electrically insulated therefrom;

a plasma gas nozzle disposed at one end of said body, encircling said electrode, and having a cooling chamber formed therein;

a protective gas nozzle concentrically disposed around said plasma gas nozzle and retained on said body in a manner to clamp the plasma gas nozzle to said body;

first passageway means in said body and directing plasma gas through said plasma gas nozzle;

second passageway means in said body and directing protective gas through said protective gas nozzle;

said body having a pair of apertures formed longitudinally therethrough;

a pair of conduit means sealingly secured to said plasma gas nozzle, disposed within said pair of apertures and forming inlet and outlet passageways for said coolant chamber;

connection means carried by said body and opening into said conduits for connecting said coolant chamber to a source of coolant;

each of said pair of apertures receiving said pair of conduits having an enlarged end portion forming an inwardly extending shoulder, and receiving said connection means;

said connection means having throughbores telescopically engaging upper end portions of said pair of conduits; and seal means resting on said inwardly extending shoulders, encircling said pair of conduits and compressed by said connection means to form a tight seal at an upper end portion of said conduits.